Aug. 29, 1944. S. BEHAR 2,357,160
TURNTABLE SLIDE SUPPORT
Original Filed Oct. 6, 1938 2 Sheets-Sheet 1
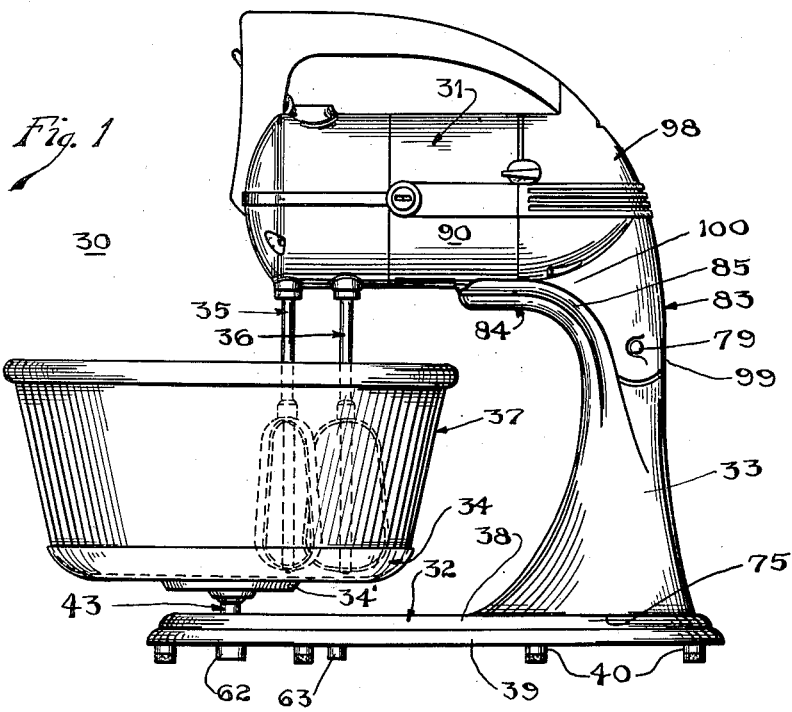
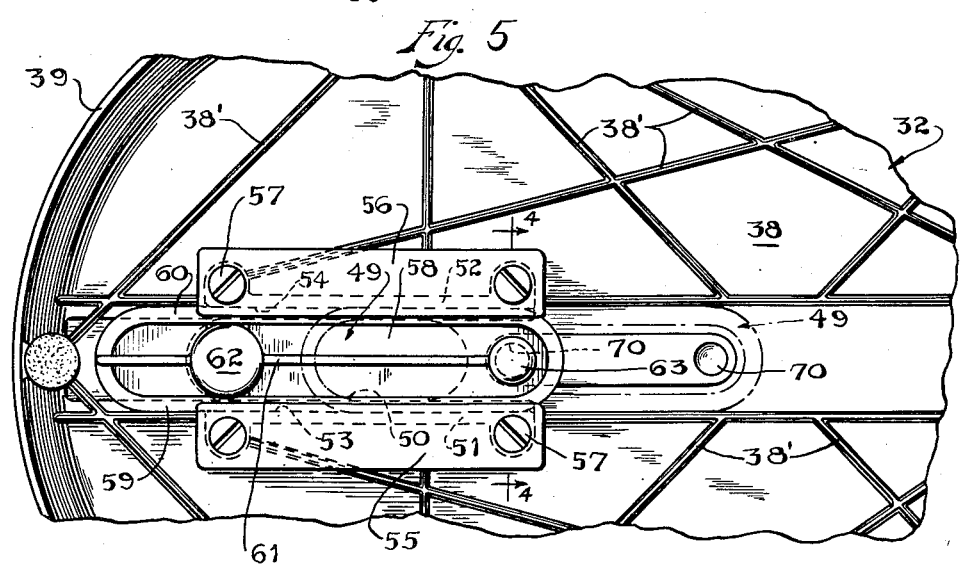
Sam Behar INVENTOR.
BY
His Attorney Aug. 29, 1944.                S. BEHAR                2,357,160
                       TURNTABLE SLIDE SUPPORT
                Original Filed Oct. 6, 1938    2 Sheets-Sheet 2
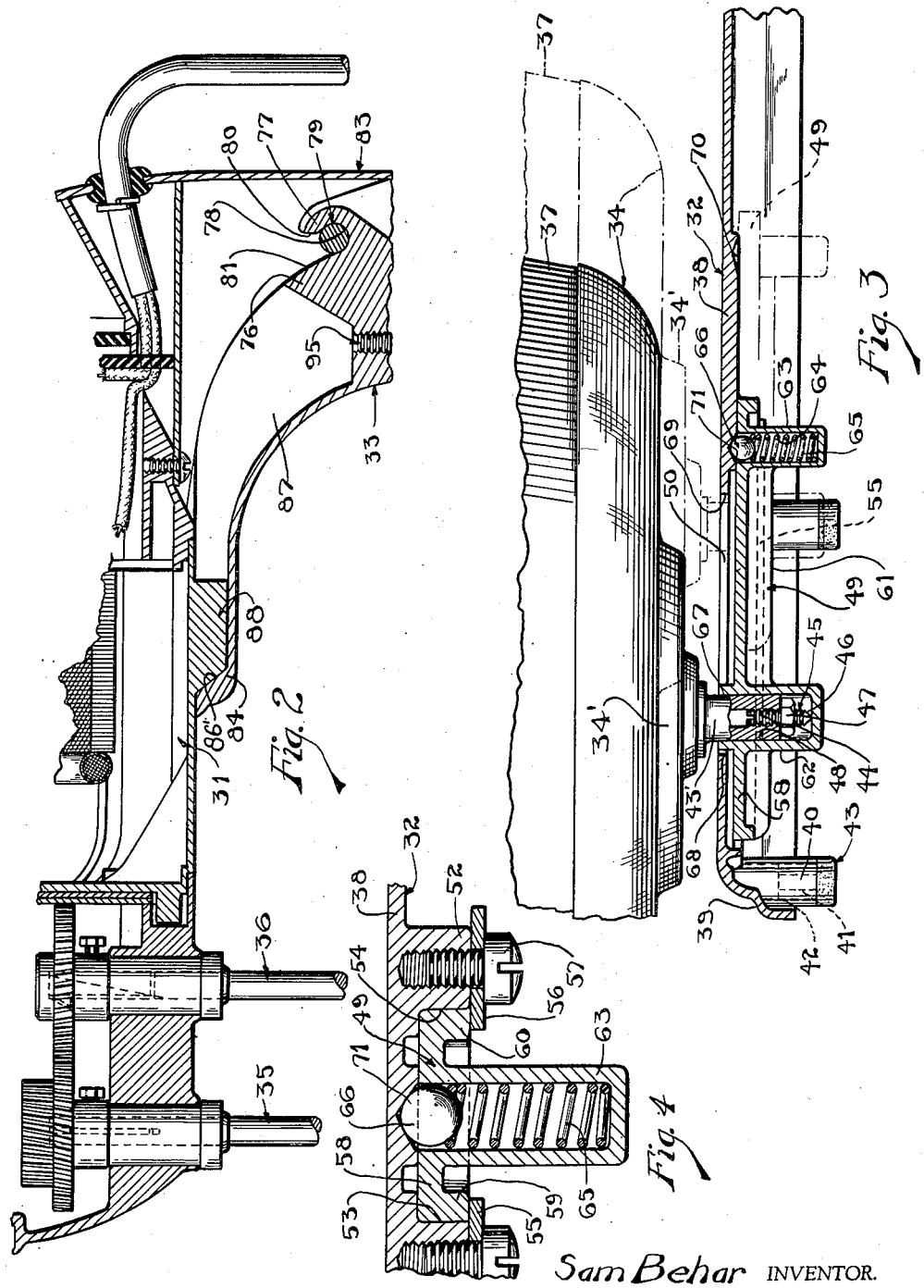
Sam Behar INVENTOR.
BY
His Attorney Patented Aug. 29, 1944

2,357,160

UNITED STATES PATENT OFFICE 2,357,160

TURNTABLE SLIDE SUPPORT

Sam Behar, Berwyn, Ill., assignor to A. F. Dormeyer Mfg. Co., Chicago, Ill., a corporation of Illinois Original application October 6, 1938, Serial No. 233,541. Divided and this application July 12, 1941, Serial No. 402,204

4 Claims. (Cl. 259—84)

The present invention relates to food mixers, and is particularly concerned with electric food mixers of the household type which are also adapted to drive a multiplicity of other food working attachments.

This application is a division of my Patent No. 2,262,912, Serial No. 233,541, filed October 6, 1938, and issued November 18, 1941, for Electric food mixers, reference to which is hereby made for a fuller understanding of the general construction of the food mixer.

One of the objects of the invention is the provision of an improved food mixer construction of the type having a turntable for supporting the bowl, in which the bearing for the turntable is slidably mounted, so that it may be moved into various different positions which are appropriate for bowls of different sizes.

Other objects and advantages of the invention will be apparent from the following description and the accompanying drawings, in which similar characters of reference indicate similar parts throughout the several views.

Referring now to the drawings in which,

Fig. 1 is a side elevational view of an electric food mixer of the household type embodying the invention, with the mixer in the mixing position on the standard;

Fig. 2 is a vertical sectional view taken on a plane passing through the axis of the motor drive shaft, showing the details of construction of the driving unit for the food mixer;

Fig. 3 is a fragmentary vertical sectional view of the base, including the turntable, in elevation, and further illustrating this arrangement for the turntable bearing;

Fig. 4 is a fragmentary vertical sectional view, taken on the plane of the line 4—4 of Fig. 5, looking in the direction of the arrows, showing the mode of retaining the turntable bearing in certain predetermined positions;

Fig. 5 is a bottom plan view of the supportng base for the food mixer, showing the details of construction of the base and a sliding arrangement for the turntable bearing, by means of which the turntable bearing may be moved to various positions for bowls of different size.

Referring to Fig. 1, the electric food mixer, which is indicated in its entirety by the numeral 30, preferably comprises an electric motor driving unit 31, a base 32 having a standard 33, turntable 34, beater elements 35, 36, and bowl 37.

The base 32 and standard 33 may be constructed of two separate cast metal pieces, the standard 33 being hollow and secured to the base by a plurality of screws passing through the base and threaded into the standard 33.

The base 32 comprises a cast metal member having a top flange 38 and a depending border flange 39, the latter being provided with a multiplicity of downwardly extending lugs 40, which form legs for the base, and which are provided with internal bores 41 for receiving the reduced cylindrical portion 42 of a rubber foot 43. The area of the base 32 is such that it is adapted to support bowls of any size which are likely to be used, and so that the motor unit 31 is stably supported at all times, and particularly when other attachments are applied to the driving unit. Thus the base 32 extends laterally beyond the end of the driving unit 31, as shown in Fig. 1, and also at both sides of the driving unit 31.

Besides the depending border flange 39, it may have a multiplicity of transversely and backwardly extending reinforcing flanges 38' underneath the top flange 38. The bowl 37 may be of any convenient size, and is preferably of such shape that the beaters 35, 36 may gain access to all parts of the ingredients in the bowl 37.

The bowl 37 has its bottom shaped to fit the cavity in the pressed sheet metal turntable 34, which may also have a second depression 34' formed therein for receiving the base of a smaller bowl. The turntable trunnion 43' may comprise a metal stand, which is riveted into the center of the turntable 34 and provided at its bottom with a threaded bore 44 for receiving a threaded bolt 45, having a conical end 46.

A lock nut 47 holds the bolt 45 in predetermined position so that the adjusted position of the bolt 45 determines the elevation of the turntable 34 and bowl 37 with respect to the beater elements 35, 36. Thus the elevation of the turntable may be adjusted so the beater elements extend into the very bottom of the bowl, but are out of contact with the bowl.

The trunnion 43 is adapted to slidably and rotatably engage in a cylindrical bore 48 of a carriage 49, also formed of cast metal, and slidably mounted on the base 32. In order that the turntable trunnion 43 may extend into its bearing 48 in carriage 49, the base is provided with a longitudinally extending slot 50 of sufficient width to clear the trunnion 43, and extending in the direction of the axis of the driving motor 31 on the base 32.

The bottom of the base 32 is provided with a pair of depending guide ribs 51, 52, which are provided with flat and parallel guiding surfaces 53, 54, opposite each other, for engaging the complementary flat side surfaces of the carriage 49.

A pair of metal plates 55, 56 are secured by means of screw bolts 57 to the ribs 51, 52, the screw bolts being threaded into the ribs, and the plates 55, 56 extending over under the carriage 49, to retain it between the guide members 51 and 52.

The carriage 49 comprises a cast metal member which is formed with a flat upper body flange 58 and a pair of depending parallel border flanges 59, 60. It is also provided with a depending reinforcing rib 61 and with the depending lug 62, having the bore 48, previously described, which serves as a bearing for the turntable trunnion 43'.

At its right end (Fig. 3) the carriage 49 is provided with another depending lug 63, having a cylindrical bore 64, which is open at the top and which contains a helical spring 65, the end of which engages a ball 66.

The turntable bearing socket 48 is bordered at the top by an upwardly extending cylindrical flange 67, which extends into the slot 50 of the base 32 and which limits the movement of the carriage 49, as the cylindrical flange 67 is adapted to engage the ends 68 of the slot 50.

The top flange 38 of base 32 is formed with a pair of depressions 70, 71, located to receive the ball 66, and the depressions 70, 71 are preferably partially spherical or conical, or provided with tapered walls so that the ball 66 may be cammed downward when the carriage 49 is moved laterally in its guides.

Similarly, when the carriage reaches either of its positions which correspond to the depressions 70, 71, the ball 66 is adapted to snap into the position 70 or 71 and retain the carriage in that position. It is possible, of course, to utilize the mixer with the carriage 49 in any of the intermediate positions, but the most frequently used positions are those at the limits of movement of the carriage 49, one of which is for the large bowl and the other of which is for a small bowl.

The proportions of the bowl and location of the beaters 35, 36 and carriage 49 are such that when the ball 66 is engaged in depression 71 the bowl is suitably located, as shown in Fig. 1, for mixture of the ingredients in the bowl by the beaters 35, 36.

The bowl 37 may then be turned by hand in order to bring all parts of the mixture into engagement with the beating elements 35, 36, or the beating elements 35, 36 being arranged on a radius of the bowl 37, they may, if the mixture is stiff enough, cause a reaction through the mixture to the bowl which will cause the bowl to rotate when the beaters are rotated.

When the ball 66 is in the depression 70, the carriage 49 and turntable 34 is suitably located so that if a small bowl has its base in the depression 34' of the turntable, it will be suitably located about the beating elements 35, 36.

In this case, however, the beating elements work substantially the full cross-sectional area of the bowl and may be located centrally of the small bowl. Various intermediate sizes of bowls may be used, and by means of the present arrangement larger bowls may be used than with any of the devices of the prior art, as the present motor driving unit is pivoted at its end and overhangs the bowl by a greater amount than the devices of the prior art.

The column or standard 33 comprises a hollow, cast metal member, having a flat bottom edge 75, which engages the top flange 38 of the base 32, to which it is secured by screw bolts, as previously described.

The column 33 tapers toward the top, and by virtue of its enlarged bottom area provides a firmer engagement between the column and base. At its upper end it is provided with an inwardly extending body 76, which is formed with an upwardly extending hook formation 77 surrounding a partially cylindrical groove 78.

The groove 78 is adapted to receive the pivot pin 79 of the motor unit, and there is a sufficient clearance at 80 between the end of the block 77 and the surface 81 of the lug 76, so that the pin 79 may be removed from its groove 78 by an upward movement when the motor is in the proper position.

The standard is also provided with a forwardly extending arm 84, forming an integral part of the standard, and bordered by the upwardly extending border flange 85 on each side. The arm 84 is also reinforced by a pair of symmetrically located reinforcing ribs such as, 87, which terminate in the lug 76, which bears the hook 77. The reinforcing ribs 87 are spaced laterally from each other and are provided with the tapered camming surfaces such as 86' for engaging a complementary lug 88 carried by the motor housing 90 (Fig. 2) for the purpose of effecting the positive alignment of the motor with the standard arm 84 when the motor is in mixing position.

The standard is also provided with a flat seating surface at the juncture of the arm 84, and the main standard body 33, for supporting a retaining spring, which is provided with a pair of retaining arms and an attaching flange as more particularly described in the Patent No. 2,262,912. The attaching flange is secured to the surface 91 by means of a screw bolt 95 which is threaded into a threaded bore in the standard, and the spring is preferably provided with a pair of upwardly extending arms carried by hairpin bends, one arm being located on each side of the pair of reinforcing flanges 87.

The motor housing 90 has its rear cover member 98 provided with a depending supporting bracket 83, which comprises a rear yoke 99 and a pair of forwardly extending flanges 100.

The flanges 100 and yoke 99 carry at their lower ends a pair of inwardly extending lugs to provide the supporting bracket 83 with sufficient body for carrying the pivot pin 79. The lugs 101 are provided with registering bores for receiving the pivot pin 79, which comprises a cylindrical metal member having a slightly enlarged and knurled surface at one end, so that when it is driven into the bores it is fixedly secured in the supporting bracket 83.

The side flanges 100 of the motor-supporting bracket 83 are spaced from each other sufficiently so that they fit between the upwardly extending border flanges 85 on the upwardly extending arm 84 of the standard 33. Thus, when the motor is in the mixing position of Fig. 1, all of the details of construction and mechanism relating to the motor support between the motor and standard are enclosed in the housing which comprises the arm 84, flanges 85, and parts 99, 100.

The motor is firmly supported on the standard and base, but may be very conveniently removed by merely lifting its pivot pin 79 out of the groove 78. When the bowl is to be removed, the motor need only be tilted backward, where it will be held by the retaining spring 82, and the beating elements are then in position so that any drippage drips back into the bowl 37.

Due to the support of the motor 31 at its rear end, a much larger overhang is provided, and larger bowls may be used with any of the devices of the prior art.

The turntable may readily have its bearing located for use with bowls of any of a plurality of different sizes. It is only necessary to push on the turntable when its trunnion is in the bearing, to cause the bearing carriage to move into the desired position.

The present base and stand structure supports the motor at its rear end instead of a point midway between the ends, as in the devices of the prior art; and therefore the motor may be provided with a greater overhang, permitting the use of larger vessels.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In an electric food mixer, the combination of a base with a motor driving unit having depending beating means, a turntable for supporting a bowl, a track below the base, a bearing carriage slidably mounted on the track below said base, means securing said carriage in the track and bearing the load of the weight carried by said carriage a bearing carried by said carriage, a trunnion carried by said turntable and rotatably mounted in said bearing, whereby a bowl carried by said turntable may be moved to any of a plurality of different positions with respect to said beating means.

2. In an electric food mixer, the combination of a base with a motor driving unit having depending beating means, a turntable for supporting a bowl, an elongated bearing carriage slidably mounted on said base, with a portion of its length concealed beneath the base and the remaining portion exposed upwardly through an elongated opening in the base a bearing carried by said carriage in the exposed portion, a trunnion carried by said turntable and rotatably mounted in said bearing, whereby a bowl carried by said turntable may be moved rectilinearly to any of a plurality of different positions with respect to said beating means, said carriage being provided with spring detent means in said concealed portion for retaining it in a predetermined bowl position in cooperation with means concealed below the base.

3. A food mixer comprising a base, a support at one end of the base, a power unit detachably received upon the support in a predetermined nonadjustable position to overhang the base, a pair of agitators depending from the power unit spaced longitudinally of the base and power unit, a turntable for supporting a mixing bowl in a position with the agitators disposed therein when the power unit is in operative position, a slide upon said base movable in the line of the beaters, means for rotatably mounting the turntable upon the slide, said turntable constituting the sole means for moving the slide to vary the position of the bowl.

4. A device of the class described for supporting a bowl with respect to a pair of agitators disposed in a predetermined plane comprising a base and support means for the agitators fixed with respect to the position of said agitators when the agitators are disposed in operating position said plane including the longitudinal dimension of the base and support means, a slide upon said base for rectilineal movement in said plane, and a bowl holder carried by said slide and mounted for independent movement with respect to said slide.

SAM BEHAR.